US007555503B1

(12) United States Patent
Neal et al.

(10) Patent No.: US 7,555,503 B1
(45) Date of Patent: Jun. 30, 2009

(54) METHOD AND APPARATUS FOR MANAGING UPDATES TO A CATALOG

(75) Inventors: Michael Renn Neal, Superior, CO (US); James Michael Wilmsen, Westminster, CO (US); Nathan Eric Wykes, Broomfield, CO (US); Ian Straub, Broomfield, CO (US)

(73) Assignee: Click Commerce, Inc., Chicago, IL (US)

( * ) Notice: Subject to any disclaimer, the term of this patent is extended or adjusted under 35 U.S.C. 154(b) by 381 days.

(21) Appl. No.: 09/608,494

(22) Filed: Jun. 30, 2000

(51) Int. Cl.
*G06F 17/30* (2006.01)
(52) U.S. Cl. .................................................. 707/203
(58) Field of Classification Search .................. 707/1–3, 707/9, 10, 100–204; 705/1, 16, 20, 22, 26–29, 705/13; 709/200–203, 217–219
See application file for complete search history.

(56) References Cited

U.S. PATENT DOCUMENTS

| 4,914,586 | A | * | 4/1990 | Swinehart et al. ........... 707/101 |
| 5,093,910 | A | * | 3/1992 | Tulpule et al. ................. 714/56 |
| 5,150,473 | A | * | 9/1992 | Zulch .......................... 711/162 |
| 5,710,922 | A | | 1/1998 | Alley et al. |
| 5,740,425 | A | * | 4/1998 | Povilus ........................ 707/100 |
| 5,761,649 | A | * | 6/1998 | Hill .............................. 705/27 |
| 5,765,171 | A | | 6/1998 | Gehani et al. |
| 5,924,096 | A | | 7/1999 | Draper et al. |
| 5,930,795 | A | * | 7/1999 | Chen et al. .................. 707/100 |
| 6,002,394 | A | * | 12/1999 | Schein et al. ................. 725/39 |
| 6,029,178 | A | | 2/2000 | Keeler et al. |
| 6,032,145 | A | | 2/2000 | Beall et al. ...................... 707/5 |
| 6,052,670 | A | * | 4/2000 | Johnson ........................ 705/27 |
| 6,052,688 | A | * | 4/2000 | Thorsen ....................... 707/100 |
| 6,078,924 | A | * | 6/2000 | Ainsbury et al. ............. 707/101 |
| 6,169,992 | B1 | | 1/2001 | Beall et al. ................... 707/103 |
| 6,202,070 | B1 | * | 3/2001 | Nguyen et al. ........... 707/104.1 |
| 6,356,893 | B1 | * | 3/2002 | Itakura et al. ................... 707/3 |
| 6,360,215 | B1 | * | 3/2002 | Judd et al. ...................... 707/3 |
| 6,377,937 | B1 | * | 4/2002 | Paskowitz ..................... 705/26 |
| 6,401,104 | B1 | * | 6/2002 | LaRue et al. ................. 707/203 |
| 6,578,030 | B1 | * | 6/2003 | Wilmsen et al. ................ 707/3 |
| 7,039,645 | B1 | * | 5/2006 | Neal et al. ................... 707/101 |

OTHER PUBLICATIONS

Silicon Integration Initiative, Inc., "Component Information Dictionary Standard", XP-002213829, VErsion 1.9, Oct. 1, 1999, pp. 2-22.
EPO Search Report EP 01 30 5419, Sep. 29, 2003, 3 pages.

* cited by examiner

*Primary Examiner*—Debbie M. Le
(74) *Attorney, Agent, or Firm*—Christopher J. Kulish, Esq.

(57) ABSTRACT

The present invention provides a method and apparatus for managing updates to a catalog based on a reference electronic catalog. The reference catalog has a reference format and a plurality of items, each with associated characteristics and the second catalog has a second format and a plurality of items, each with associated characteristics. The reference catalog is maintained with updates and revisions to the items and associated characteristics and the second catalog is maintained by repeating the mapping of at least a portion of the reference catalog into the second catalog after maintaining the reference catalog. Preferably, the maintenance times for both catalogs are recorded and the second catalog is maintained by comparing the recorded times and mapping only portions of the reference catalog that have been maintained into the second catalog.

26 Claims, 4 Drawing Sheets

METHOD AND APPARATUS FOR MANAGING UPDATES TO A CATALOG

FIELD OF THE INVENTION

This invention relates to electronic databases in general, and more specifically to a method and apparatus for managing updates to an electronic catalog in which a first catalog serves as a reference to the catalog or catalogs that is or are updated.

BACKGROUND OF THE INVENTION

Searchable electronic catalogs are commonly used in support of electronic commerce and purchasing functions. These electronic catalogs typically are rendered into databases, HTML page collections and other electronic means. Individual purchaser or marketplace system installations benefit by maintaining a single catalog rather than several different catalogs from several different sources. With multiple catalogs, for example, an office supply procurement system may contain office supply catalogs from several different office supply vendors or manufacturers. Some of the catalogs may describe identical items such as a blue pen while each catalog will likely describe similar but different items, such as different makes of blue pens. By combining the catalogs into a single catalog, desired items can be found and compared more quickly and easily than with multiple catalogs.

Unfortunately, different purchaser and marketplace installations have different specifications for a combined electronic catalog. These specifications arise from differences in languages and measuring, from regional legal requirements, from needs in the particular industry or marketplace or from preferences of the catalog user. Different preferences in categorizing items also create different requirements. In order to satisfy the differing needs of purchasers, marketplaces and suppliers different catalogs in different formats must be provided. The proliferation of different catalogs requires that each different catalog be separately maintained with revisions, updates, new items and restructuring. The present invention allows a single reference catalog to be used to maintain many different catalogs in many different formats. The reference catalog simplifies updates and revisions since all maintenance can be performed on a single catalog. It is consistently updated and maintained and these updates and revisions are then applied to each of the different purchaser, marketplace and supplier catalogs. The updates can include both changes in the structure and organization of the catalog as well as product and service information.

SUMMARY OF THE INVENTION

In a preferred embodiment, the present invention includes a method and apparatus for managing updates to a catalog based on a reference electronic catalog. The reference catalog has a reference format and a plurality of items, each with associated characteristics and the second catalog has a second format and a plurality of items, each with associated characteristics. The method comprises, maintaining the reference catalog with updates and revisions to the items and associated characteristics, establishing a second catalog format for a second catalog, mapping at least a portion of the reference catalog into the second format to create the second catalog, and maintaining the second catalog by repeating the mapping of at least a portion of the reference catalog into the second catalog after maintaining the reference catalog.

In a preferred embodiment, the method includes mapping only portions of the reference catalog that have been maintained into the second catalog. In a further preferred embodiment, the method further includes recording the time of each maintenance of the reference catalog and recording the time of each maintenance of the second catalog and maintaining the second catalog includes comparing the recorded times and mapping only portions of the reference catalog that have been maintained into the second catalog. In a further preferred embodiment, the method further includes associating a record with each item of the reference catalog and second catalog, respectively, and maintaining the second catalog includes comparing the recorded times for each item in the second catalog to the recorded times for each corresponding item in the reference catalog and mapping any changes in the reference catalog that occur after the last change in the second catalog to the second catalog.

Alternatively, in a further preferred embodiment, the invention includes compiling a record of operations performed on the reference catalog and the time that each operation was performed, compiling a record of operations performed on the second catalog and the time that each operation was performed, performing the operations on the second catalog that are performed on the reference catalog and that also have a later time than the last operation performed on the second catalog. An operation preferably includes at least one of updating, revising and reformatting characteristics of an item and adding new items. The catalog characteristics preferably include attributes and categories.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

The present invention is directed toward maintaining an electronic catalog of items with associated characteristics using a reference electronic catalog in a different format. The catalog constitutes a list of items and an associated description of each item. The catalog can be in the format of a database or any other electronic format, such as a spreadsheet or text. The catalog is created, expanded, updated or maintained based on any such electronic format. The software that operates on the catalog can be written to handle a variety of different formats. The present application will describe the invention in terms of a database catalog.

In the context of the present invention, the terms catalog and database should not be construed as limited to any particular type of structure but rather in a broader sense as a list or a sequence in which items are accompanied by descriptions. Such a catalog or database can be viewed, for example, as a collection of two-dimensional tables in which each row represents a different item or record and each column represents a different attribute, category or field. In the case of a catalog of office supplies, a record provides the catalog information for a particular office supply item such as a particular pen. Different pens each have a different record. For each record, there are several fields. Each field describes an attribute of the item such as price, color, weight, size, etc. Other fields describe categories for the item such as dry goods, office supplies, writing implements. The present invention analyzes the values that are entered into the fields of the database, whether they are attributes or categories or any other characteristic of an item.

Table 1 below shows an example of a portion of a table of catalog information for three items in a magazine rack category. In Table 1, each item occupies a different column. The attributes are identified on the left and the attribute values for each item are provided in the respective column.

TABLE 1

| Category: | Magazine Racks | Magazine Racks | Magazine Racks | ... |
|---|---|---|---|---|
| Item ID | 00345872 | 00345873 | 00345874 | |
| UOM: | EA | EA | EA | |
| Price: | 234 | 499 | 110.95 | |
| Sup Name: | Corporate Express | Corporate Express | Corporate Express | |
| Sup Part Num: | 1857119 | 1568220 | 2103679 | |
| Description: | Organizer, Literature, 24 Compartment, Tropic Sand | Organizer, Literature, 60 Compartment, Oak | Display Rack, 23 Pocket, Putty | |
| Mfg Part Num: | SAF9211TS | SIRLO60AO | BDY08136 | |
| Mfg Name: | Safco Products Co | Sirco Office & Computer Furniture | Buddy/Difiglio Ent | |
| Color: | Tropic Sand | Oak | Putty | |
| No. of Compart. | 24 | 60 | 23 | |

Figure 1:
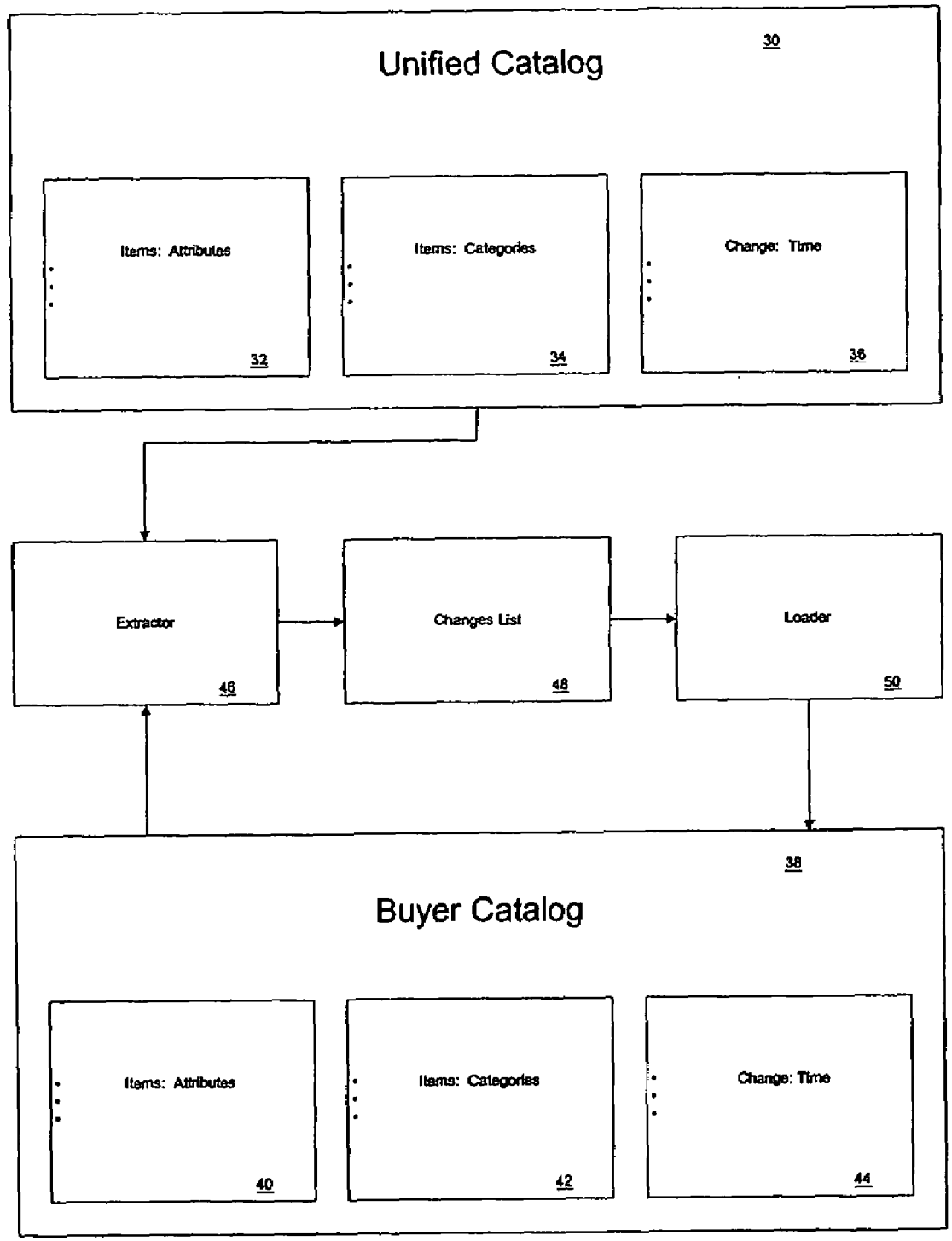
FIG. 1 is a block diagram showing components that may be used to implement one embodiment of the present invention.

FIG. 1 shows a general structure for implementing the present invention. In a preferred embodiment, a reference catalog is created and maintained which forms the basis for specialized catalogs for many different purchasers, suppliers and marketplaces. The reference catalog is referred to as the Unified Catalog 30 and it contains several tables. The tables include a table of items with associated attributes 32, a table of items with associated categories 34 and a table of changes with associated times 36. While the reference catalog is shown as the Unified Catalog, any catalog may be used as a reference catalog. The Unified Catalog contains a variety of items sufficient to support many different catalogs. For example, the items preferably include office supplies, electronic components, industrial fasteners, and electrical motor system parts, among many others. The attributes for each item describe the item in order to support finding, identifying and purchasing an item and include characteristics such as SKU (stock keeping unit), UPC (universal product code), supplier, part number, price, size, weight, color, material, country of origin and so on. In addition, each part is associated with at least one category. Ballpoint pens would be in a category of Pens, or of office supplies, or of writing instruments or all three, for example. The specific structure of the reference catalog in terms of categories and attributes is not essential to the present invention and many variations on any format is possible.

In addition, the reference catalog has a specified style set forth in a style guide. The style guide requires, for example that the color black is always spelled out in full and capitalized ("Black") when used to describe a particular characteristic of an item. A particular purchaser catalog, on the other hand may specify that Black be rendered by "bk." The particular style selected is not important. It is preferred, however, that a style be specified in order to ease the use of both the reference catalog and the purchaser, supplier or marketplace catalog. The use of different styles in different catalogs complicates maintenance, however, as will be discussed below.

The reference catalog is maintained almost continuously, with new items, revisions to old items and restructuring. The revisions are required when any characteristic of an item in the catalog changes, such as price or color. New items are added to expand the reference catalog and also to accommodate changes in supplier offerings. The restructurings can happen for many reasons. Typically this is required when a group of items in one category are to be moved to another category, but it can also happen when new attributes are to be added to a group of items in exchange for old attributes or when there is a change in the style or format of the reference catalog. All of these changes in the catalog are tracked in the changes table 36. This table preferably has a description of the change and a time and date stamp associated with each item that experienced a change. The description of the change can simply be what was changed, the name of the operation, the former value for the characteristic or item, the affected item and the time of the operation. For example, to record that an item was moved from the "pens" category to the "roller ball" category, the record contains "category, rename, pens, item 1234, 14:23:48, 04:17:2001." This particular format is presently preferred, however, the records may be kept in a variety of different ways. For this format, to determine what the category was changed to one must refer to the particular item in the category table.

FIG. 1 also shows a buyer catalog 38 which also includes a table of items with associated attributes 40, a table of items with associated categories 42 and a table of changes with associated times 44. While the second catalog is shown as a buyer catalog, the second catalog may be a supplier catalog, a marketplace catalog, a general purchasing catalog or any other catalog. The attribute and categories tables are similar to the ones described above with respect to the reference catalog except that the attributes and categories may be described differently, and more or fewer attributes and categories may be associated with each item. For example, a purchaser may desire that its catalog include separate internal reference numbers or department numbers for different items. These separate numbers are maintained by the purchaser and not using the reference catalog since the numbers do not occur in the reference catalog. The categories may have different names or may be built into a different hierarchical system, for example, paper may be in an "office supply" category or a "stationery" category or in a "paper goods" category and these categories may be sub-categories or super-categories to other categories, all of which may be different between the reference catalog and the secondary buyer catalog. In addition, the style of the buyer catalog may be different from that of the reference catalog, so for example, as mentioned above, the color black is always shown as "bk."

The changes table 44 of the second catalog is preferably configured in the same way as the changes table 36 of the reference catalog for ease of use but shows only changes to items in the buyer catalog. A comparison between the two changes tables can then quickly determine the operations that were performed in the reference catalog and not in the buyer catalog.

To accomplish this comparison, FIG. 1 shows an extractor 46. The extractor is coupled to the reference catalog and the buyer catalog and accesses the changes tables as well as the other table. It is preferred that the accessing and location of information in both databases is performed using the invention described in U.S. Pat. No. 6,032,145, issued Feb. 29, 2000, entitled Method and System for Database Manipulation and assigned to the assignee herein, the disclosure of which is hereby incorporated fully by reference herein. The extractor looks at the list of operations performed on the reference catalog and on the buyer catalog and compiles a list of operations that have been performed on the reference catalog, apply to items in the buyer catalog and have not been performed on the buyer catalog. This is the changes list 48.

The list of changes can be compiled by looking at every operation in the two changes tables and comparing, however, it is preferred that the time information associated with each operation be used. In this way, the extractor looks only at operations performed on the reference catalog only after the last operation that was performed on the buyer catalog. These reference catalog operations are then limited to those that apply to items in the buyer catalog. Typically, the buyer catalog will contain fewer items than the reference catalog, however, a buyer may add items to its catalog which are not present in the reference catalog. In addition, it may be preferred, rather than establishing a single reference catalog, that several smaller catalogs be created so that the buyer catalog contains more items than any one reference catalog. The reference catalogs may also be distributed to different locations, systems or responsible maintenance organizations so that each reference catalog is separately maintained at different times and in different formats. In all of these instances, the present invention can be used to compare the changes table in any one reference catalog and extract the needed changes for items in the buyer catalog.

The changes list 48 is applied to a loader 50. The loader converts the list data into an electronic format that can be loaded easily and directly into the buyer catalog 38. Presently XML is preferred so that the loader takes the extracted information in the changes list and creates a series of XML statements that can be applied directly to the buyer catalog to update the buyer catalog. The example above was a changes table entry of "category, rename, pens, item 1234, 14:23:48, 04:17:2001." Thus on Apr. 17, 2001 at the time 14:23:48, for item 1234, the category value was changed from "pens." The extractor on seeing this entry refers to the changes table for the buyer catalog and sees that there is no entry for item 1234 after the category rename. The extractor then goes to the category table in the reference catalog to determine that the category value for item 1234 is "roller ball." The extractor adds a mapping rule to the changes list, map the category value in item 1234 to "roller ball." This mapping rule is converted in the loader into an XML sequence for application to the buyer catalog.

When the mapping rule is loaded, into the buyer catalog, the category value for item 1234 will be changed to "roller ball" and an entry will be made in the changes table that will match the corresponding entry in the reference catalog but with the time stamp that applies to the change in the buyer catalog. In this way, the entire catalog can be updated to reflect updates to the reference catalog. In addition the records made in the reference catalog and in the buyer catalog make it simple to ensure that all of the updates, revisions, and restructurings have been applied.

The combination of the XML actions with the ability to track changes in the catalog allows catalogs to be kept in-sync with one another by creating delta difference changes and applying the changes with the XML actions. For large catalogs, it is cumbersome to transport an entire catalog to support replication. Catalogs can communicate changes with each other via a delta difference process; in which only information that has changed since the last update is sent.

Figure 2:
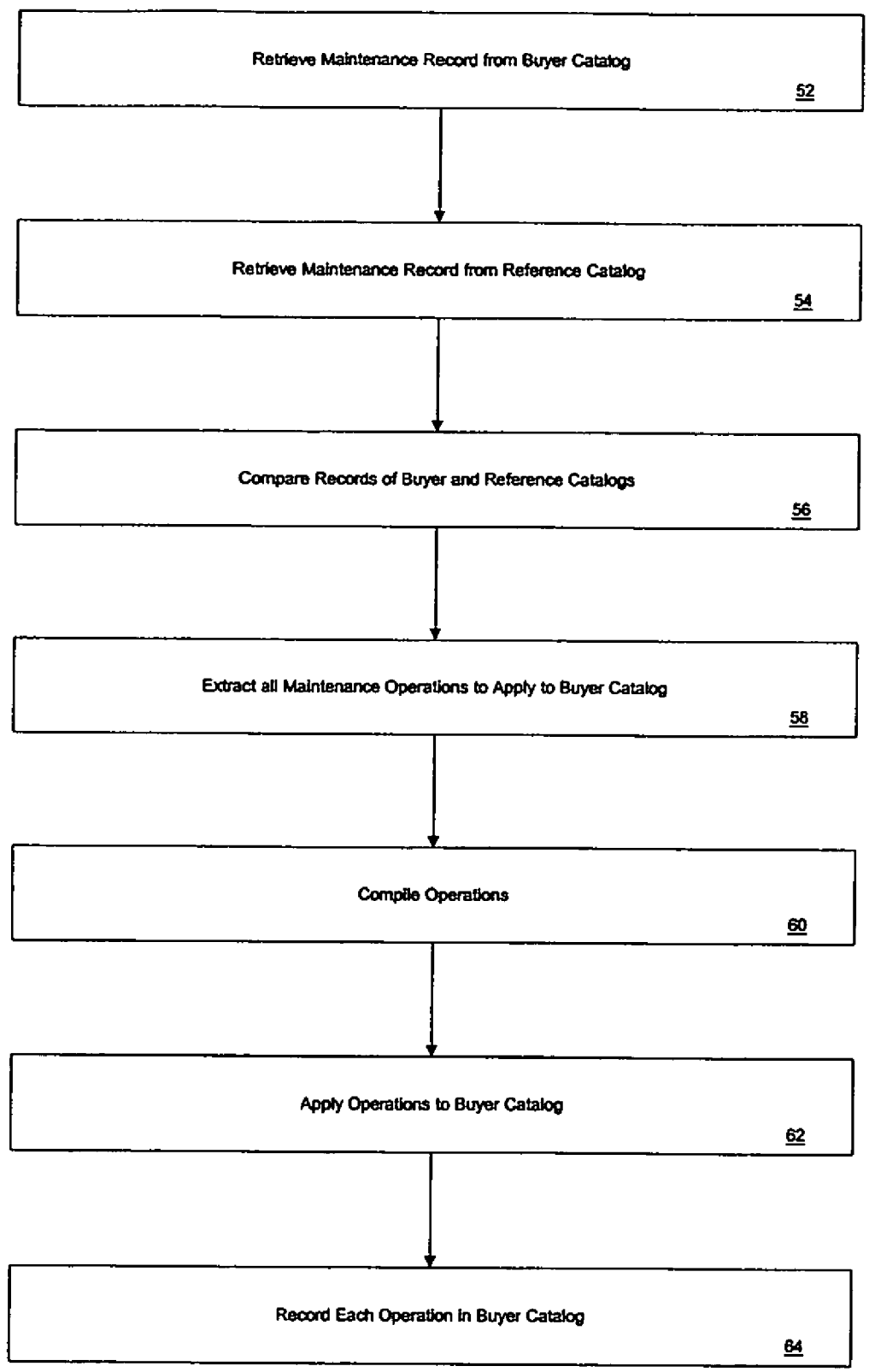
FIG. 2 is a flow diagram showing one embodiment of the present invention.

FIG. 2 is a flow diagram which shows the process that has just been described. First, maintenance records are retrieved from the buyer catalog by accessing the changes table 52. Next, the maintenance records in the changes table of the reference catalog are retrieved 54. The maintenance records are compared to each other 56 so as to extract all of the operations that are to be performed on the buyer catalog 58. Preferably, times associated with each record are used to select the operations that have not yet been performed and the item numbers are compared to select only the operations that apply to items that are in or should be in the buyer catalog. The operations are compiled 60, preferably into XML statements and then applied to the buyer catalog 62. As a part of the application of the operations, a record is made 64 in the buyer catalog changes table for each operation that is performed.

Alternatively, the extraction can be performed by extracting the product categories or items that appear in the buyer catalog and also in the reference catalog and then providing replacement listings for all of the relevant items. This type of extraction can be done without referring to the changes tables. In the example above, instead of changing "pens" to "roller balls," the process would instead replace the entire record for item 1234. As mentioned above, however, a buyer catalog may have characteristics of items that are maintained by the buyer or that have been added by the buyer. In addition, the buyer catalog may be in a different format than the reference catalog. In accordance with the present invention, the entire record for item 1234 is not simply written into the corresponding record in the buyer catalog, it is mapped into the appropriate categories and attributes as defined by the mapping rules between the reference catalog and the buyer catalog. Mapping values from one catalog into another catalog is defined in more detail in co-pending patent application Ser. No. 09/608,784 filed concurrently herewith, entitled Method and Apparatus for Mapping One Catalog into Another Catalog and assigned to the assignee herein, the disclosure of which is hereby incorporated fully be reference herein.

Figure 3:
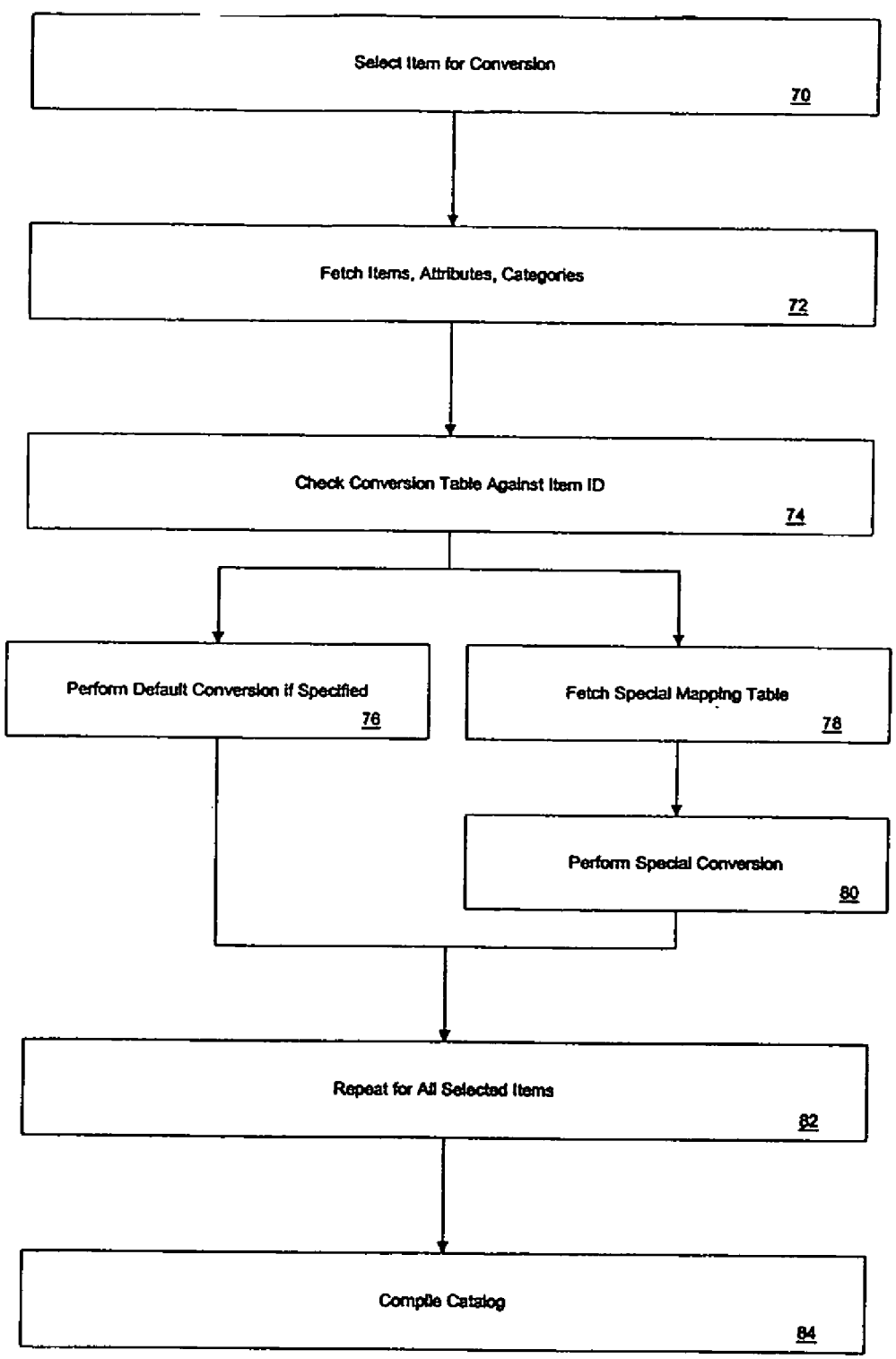
FIG. 3 is a flow diagram showing a further detail for mapping values of one catalog into another.

The mapping is presented briefly in FIG. 3 which shows a generalized flow diagram for mapping values from the reference catalog to the buyer catalog. The process is also used to create a new electronic catalog from an existing electronic catalog. This is important when the buyer catalog presents information about items in a different way either to meet certain business requirements or to satisfy unique tastes. For example, a building supply wholesaler and an aircraft manufacturer may purchase the same fasteners from the same supplier but have different requirements for finding and ordering the fasteners. Similarly, an aircraft manufacturer in Norway and an aircraft manufacturer in the United States may have different requirements for ordering the same fastener. The mapping process is also useful when reconfiguring an existing catalog to accommodate changes in industry or the marketplace. For example, a product may appear to fit within an existing category but later become such a large group of products that it requires its own category. These kinds of changes are among the changes that would be extracted from the changes table in the reference catalog, however, they can also be applied to the buyer catalog only.

In FIG. 3, initially items are selected for conversion 70. The selection of the items is preferably made on the basis of the extraction described above. For example, if the purpose of conversion is to accommodate a reclassification of items, then only the reclassified items will be selected. Next, the values for the selected items are retrieved from the catalog 72. Each selected item is then checked against a table that contains the conversion information to go from the first catalog format to the second catalog format 74. It is presently preferred that the conversion be performed on each item, one item at a time, however, the conversion can be performed on attributes or categories and the list organized by attribute or category. The conversion can alternatively be performed on all items with each step being performed for each item before moving on to the next item.

The table will not only specify the conversion rule but will also specify whether there are any special cases to apply. If there is a special case to apply then it is fetched from the table referred to in the conversion table 78. It is preferred that this table contain a listing of the items to which a special case apply together with the specific unique conversion as will be better understood in the context of the description below. If there is no special case, or if the special case does not apply to the item in question, then the default conversion is performed 76.

The default conversion can take many forms, differing in complexity. A straightforward conversion is to change the value for an attribute or category for a particular item to a different value for the same attribute or category for the item. For example, the first catalog may have a category called "Writing Instruments" and the second catalog may use "Pens" instead. This is a matter of user preference and the present invention, through the mapping tables, can accommodate many different style preferences. The rule, then maps all the category values that are "Writing Instruments" into "Pens." The same principle applies when converting the catalog into a different language. Each value will be mapped directly into a selected corresponding expression in the language of the second catalog. For example, the color attribute value "Black" maps to "Svart" and the color attribute "Brown" maps to "Brun." The table will provide mapping rules for all of the conversions for all anticipated values of the relevant attribute. The same principle also applies to the use of abbreviations and the use of case. The table for the item may require that "cc." be mapped to "CC," that "ea." be mapped to "each," or that "Lbs." be mapped to "Pd." or "Net Pounds."

The same principle also applies to changes in category or attributes. The first catalog may provide a single category "Ballpoint Pens," while the second catalog includes Ballpoint Pens" as a subcategory to "Pens" which is a subcategory to "Office Supplies." In this case, there is a one-to-one mapping for the items with the category value "Ballpoint Pens" into all three of the tiered categories in the second catalog. Accordingly, based on the category value "Ballpoint Pens," the table will specify a mapping of the value "Ballpoint Pens" into the first tier category, "Pens" into the second tier category and "Office Supplies" into the third tier category. In another example, the first table may provide for an attribute of "Description" while the second table may provide for an attribute of "Ink Color." In order to make the conversion, the ink color values in the description attribute must be mapped to the "Ink Color" attribute. This mapping will work well for pens and pencils but for erasers, a different mapping will be required. The mapping for erasers can be identified as a special case.

It is preferred that the table provide a default rule and if there is a special case for particular items, that the special case be treated in another table. For the examples above, there may be some items in the "Writing Instruments" category that are not to be mapped to "Pens," for example. The special mapping table will identify these items by item number, supplier and supplier part number, or some other unique identifier, and instead map them to a different category such as "Markers." The default table accommodates the greatest number of items in the simplest way and permits the complicated cases to be handled separately. In another example, it may be preferred for some applications that "cc." be mapped to "CC" only for some items but for other items that "cc." be mapped to "ML" due to the particular market or industry served by the catalog. Again, in such a case the default mapping is to "CC" and the special case is to "ML."

The simplest case above, mapping items in the "Writing Instruments" category to the "Pens" category can be called a one-to-one mapping. For a one-to-one mapping, when a value for a particular attribute or category is to be mapped into a different attribute or category, the default mapping table just described is used. When there is a special case, this is a conditional mapping, for example the "cc." to either "CC" or "ML." For a conditional mapping, when the same value for different items is to be mapped into a different value depending upon the item, then a special case is used to distinguish which mapping is to be applied to which item. For a many-to-one mapping, when several different values are to be mapped to the same value, again the default rule for each value is used. This would be the case if "Ballpoint Pens" were to be mapped to "Pens" and "Roller Ball Pens" were also to be mapped to "Pens." As can be understood from the examples above, using this basic structure of tables with defaults and special cases, any type of mapping can be accommodated, one-to-one, one-to-many, many-to-one, many-to-many, etc.

Additional operations can be added to the mapping table to accommodate more sophisticated changes. For example, if a first catalog requires different units of measure from a second catalog, e.g., inches and centimeters, then it is not enough to change the designation of the unit of measure, the numerical value must be converted, e.g. the value in inches must be multiplied by 2.54. Accordingly, the table sets forth not only the mapping of the units designator (in.) to another designator (cm.) but also the conversion rule for converting the numerical value to the new units of measure. Another example is if the second catalog requires a different grammatical structure, e.g. "Blue Pen," not "Pen, Blue." Again the table must specify that the words are to be reversed in order and the comma deleted.

Another level of complexity is required for some types of mapping such as when multiple attributes or catalogs are collapsed into a single attribute or category in the second catalog. For example, the first catalog may have a attributes of "Width," "Height," and "Depth," while the second catalog has "Size." In such a case the table sets forth that the values for the three attributes are assembled together with the desired syntax, e.g. "x" between each number, and mapped into the "Size" attribute. Similarly the table will accommodate a change in the opposite direction by specifying that the value is to be disassembled and the values each mapped into the one of the three respective attributes.

According to FIG. 3, the default conversion is applied to the item, if the default conversion is specified 76. Alternatively, if a special mapping is specified, then the table for the special case is retrieved 78 and the conversion for the special case, as outlined above, is applied 80. This process is repeated until all of the selected items are converted 82. In a preferred embodiment, the process is performed item-by-item and every attribute and category for the item to which a conversion applies is converted before moving on to the next item. As mentioned above, the conversion can be performed in any other order. Similarly the conversion can be based on attributes, categories or any other characteristic of items in the catalog. For example, all attribute values for a particular attribute can be converted for every item before moving to the next attribute. If conversion is only required for some of the characteristics of the items, this approach may be preferred. Finally, the converted values are recompiled into the buyer catalog 44.

Tables 2 and 3 below show, as an example, a result of mapping one of the magazine racks from the first catalog shown in Table 1 into a second catalog. Table 2 shows the partial table from the first catalog for a magazine rack shown in Table 1. Table 3 shows a hypothetical example of how the magazine rack can be mapped into a second catalog applying the principles of the present invention. All of the information in the second catalog (Table 3) is derived from information in the first or source catalog (Table 2). The category has been renamed, several of the attributes have been renamed, the values for UOM, price and description have been modified. Price has been converted from dollars to pounds and the units designator "£" has been inserted. Finally, Mfg Part Num has been deleted. These changes all represent examples of the kinds of changes that can be performed to a single item applying the present invention. By applying the present invention to build an entire catalog, the second catalog can become very different from the source catalog.

TABLE 2

| Category: | Magazine Racks | ... |
|---|---|---|
| Item ID | 00345872 | |
| UOM: | EA | |
| Price: | 234 | |
| Sup Name: | Corporate Express | |
| Sup Part Num: | 1857119 | |
| Description: | Organizer, Literature, 24 Compartment, Tropic Sand | |
| Mfg Part Num: | SAF9211TS | |
| Mfg Name: | Safco Products Co | |
| Color: | Tropic Sand | |
| No. of Compart. | 24 | |
| . | | |
| . | | |
| . | | |

TABLE 3

| Category: | Storage and Containers | ... |
|---|---|---|
| Item ID | 00345872 | |
| UOM: | Each | |
| Price: | 156£ | |
| Vendor: | Corporate Express | |
| Vendor ID: | 1857119 | |
| Description: | Magazine Racks, Literature Organizer | |
| Manufacturer: | Safco Products Co | |
| Color: | Tropic Sand | |
| No. of Compart. | 24 | |
| . | | |
| . | | |
| . | | |

The present invention is preferably implemented in Java software instructions using XML (Extensible Mark-up Language) although any other computer programming language can be used. The Java code can be run on a wide variety of computer systems. The preferred XML implementation is designed to allow maximum flexibility by specifying as little as possible in the XML document type definition (DTD). Preferably, a language is specified to support the modification of the existing structure of items within a catalog. To implement the mapping, each affected schema or data element has an XML attribute that specifies the action to perform and sub-elements that specify the data upon which the action is performed. The available options for the action attribute are ADD, UPDATE, DELETE, MOVE, COPY. This allows catalogs to communicate changes to one another. A catalog can communicate deletes, updates to content, and reclassifications of items using the MOVE action. The reclassifications support mapping of category specific attributes so that data is not lost during a reclassification. The XML statements easily permit the mappings to be specified by user, category, attribute or the nature of a value in the catalog.

The following example XML statement shows how a move action can be used to map all items in the "Pens" category of the source catalog to a "Fine Writing Instruments" category in a second catalog. In addition, values for attributes of "Color" and "Point" are mapped to the corresponding attributes in the second catalog that are labeled "Ink Color" and "Point Style."

```
<!--Move all items in the Pens to the Markers category. Map
the value for the Color and Point attributes in the Pens cat-
egory to Ink Color and Point Style in the Fine Writing Pens
category-->
<ITEM action="MOVE">
    <OWNER><NAME>Pens</NAME></OWNER>
    <UPDATE>
        <OWNER><KEY>Fine Writing Pens</KEY></
            OWNER>
        <KEYVALUE>
            <KEY>Ink Color</KEY>
            <VALUE>Color</VALUE>
        </KEYVALUE>
        <KEYVALUE>
            <KEY>Point Style</KEY>
            <VALUE>Point</VALUE>
        </KEYVALUE>
    </UPDATE>
</ITEM>
```

The following XML statement provides an example of how to convert from units of measurement using an "ADD" action. First the statement creates a new attribute "Product Shipping Weight" to a category of items "Pen Gift Set." The statement takes the weight for the existing items, converts it to grams and adds the designation "gram" to the value for the "Product Shipping Weight" attribute.

```
<!--Add an attribute called Product Shipping Weight to the
Pen Gift Set category. Application specific NAMEVALUE's
for length, hidden, searchable and default value. Pound is the
base unit of measure and gram is a derived with its conversion
specified-->
<ATTRIBUTE action="ADD">
    <NAME>Product Shipping Weight</NAME>
    <OWNER><NAME>Pen Gift Set</NAME></OWNER>
    <TYPE>String</TYPE>
    <NAMEVALUE>
        <NAME>LENGTH</NAME>
        <VALUE>100</VALUE>
    </NAMEVALUE>
    <NAMEVALUE>
```

```
<NAME>HIDDEN</NAME>
<VALUE>YES</VALUE>
</NAMEVALUE>
<NAMEVALUE>
<NAME>SEARCHABLE</NAME>
<VALUE>YES</VALUE>
</NAMEVALUE>
<NAMEVALUE>
<NAME>DEFAULTVALUE</NAME>
<VALUE>5</VALUE>
</NAMEVALUE>
<UNITELEMENT action="ADD" type="BASE">
<NAME>Pounds</NAME>
</UNITELEMENT>
<UNITELEMENT action="ADD" type="DERIVED">
<NAME> Gram </NAME>
<MULTIPLIER>453.5</MULTIPLIER>
<ADDER>0</ADDER>
</UNITELEMENT>
</ATTRIBUTE>
```

As mentioned above, it is preferred that a single catalog be maintained with full updates to all items so that partial and reconfigured catalogs may be provided at any time using the present invention. In this way, it is no longer necessary to separately maintain each of the catalogs.

Figure 4:
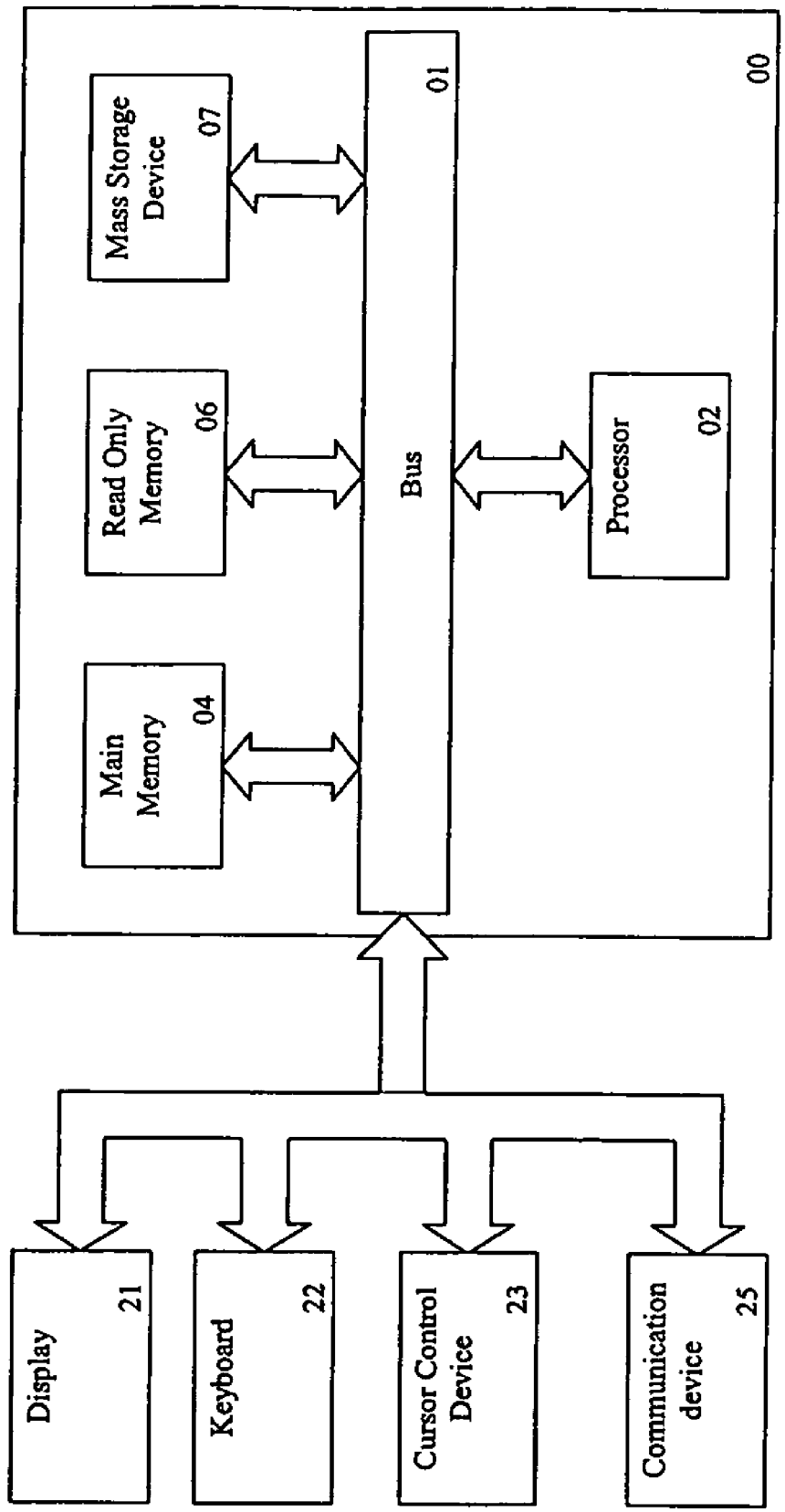
FIG. 4 is an example of a typical computer system upon which one embodiment of the present invention may be implemented.

The present invention is preferably implemented in Java software instructions although any other computer programming language can be used. The Java code can be run on a wide variety of computer systems. An example of such a computer system upon which the present invention may be implemented will now be described with reference to FIG. 4. The computer system comprises a bus or other communication means 1 for communicating information, and a processing means such as a processor 2 coupled with the bus 1 for processing information. The computer system further comprises a random access memory (RAM) or other dynamic storage device 4 (referred to as main memory), coupled to the bus 1 for storing information and instructions to be executed by the processor 2. The main memory 4 also may be used for storing temporary variables or other intermediate information during execution of instructions by the processor 2. The computer system may also include a read only memory (ROM) or other static storage device 6 coupled to the bus 1 for storing static information and instructions for the processor 2.

A data storage device 7 such as a magnetic disk or optical disc and its corresponding drive may also be coupled to the computer system for storing information and instructions. The computer system can also be coupled via the bus 1 to a display device 21, such as a cathode ray tube (CRT) or Liquid Crystal Display (LCD), for displaying information to an end user. For example, graphical and textual indications of installation status, time remaining in the trial period, and other information may be presented to the prospective purchaser on the display device 21. Typically, an alphanumeric input device 22, including alphanumeric and other keys, may be coupled to the bus 1 for communicating information and command selections to the processor 2. Another type of user input device is a cursor control 23, such as a mouse, a trackball, or cursor direction keys for communicating direction information and command selections to the processor 2 and for controlling cursor movement on the display 21.

A communication device 25 is also coupled to the bus 1. The communication device 25 may include a modem, a network interface card, or other well known interface devices, such as those used for coupling to Ethernet, token ring, or other types of physical attachments for purposes of providing a communication link to support a local or wide area network, for example. In any event, in this manner, the computer system may be coupled to a number of clients or servers via a conventional network infrastructure, such as a company's Intranet or the Internet, for example.

It may be appreciated that a lesser or more equipped computer system than the example described above may be desirable for certain implementations. Therefore, the configuration of the computer system will vary from implementation to implementation depending upon numerous factors, such as price constraints, performance requirements, technological improvements, and other circumstances.

It should be noted that, while the steps described herein may be performed under the control of a programmed processor, such as the processor 2, in alternative embodiments, the steps may be fully or partially implemented by any programmable or hard coded logic, such as Field Programmable Gate Arrays (FPGAs), Transistor-Transistor logic (TTL), or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention are described with reference to maintaining an electronic catalog using a reference catalog, the method and apparatus described herein are equally applicable to the maintenance of any sort of database based on a reference database. For example, the techniques described herein are thought to be useful in connection with databases for client or customer management, for inventory management and for transportation management and scheduling.

While this invention has been particularly shown and described with reference to a preferred embodiment thereof, it will be understood by those skilled in the art that variations, adaptations and modifications may be made therein without departing from the spirit and scope of the invention as defined by the following claims.

What is claimed is:

1. A method of maintaining a catalog based on a reference electronic catalog, the method comprising:
providing a reference catalog that has a reference format and a plurality of items, with each item having associated characteristics stored in one or more data fields associated with the item, wherein the reference catalog is not a list of pointers to data access structures that are used to control access to data;
maintaining the reference catalog with updates and revisions to the items and associated characteristics;
establishing a second catalog format for a second catalog;
mapping at least a portion of the items and associated characteristics of the reference catalog into the second format to create the second catalog;
maintaining, independently of maintaining the reference catalog, the second catalog by repeating the mapping of at least a portion of the reference catalog into the second catalog after maintaining the reference catalog, wherein the second catalog format may be different than the reference format; and
recording the time of each maintenance of the reference catalog and recording the time of each maintenance of the second catalog and wherein maintaining the second catalog comprises comparing the recorded times and mapping only portions of the reference catalog that have been maintained into the second catalog.

2. The method of claim 1 wherein repeating the mapping comprises mapping only portions of the reference catalog that have been maintained into the second catalog.

3. The method of claim 1 wherein recording comprises associating a record with each item of the reference catalog and second catalog, respectively, and wherein maintaining the second catalog comprise comparing the recorded times for each item in the second catalog to the recorded times for each corresponding item in the reference catalog and mapping any changes in the reference catalog that occur after the last change in the second catalog to the second catalog.

4. A method of maintaining a catalog based on a reference electronic catalog, the method comprising:
providing a reference catalog that has a reference format and a plurality of items, with each item having associated characteristics stored in one or more data fields associated with the item, wherein the reference catalog is not a list of pointers to data access structures that are used to control access to data;
maintaining the reference catalog with updates and revisions to the items and associated characteristics;
establishing a second catalog format for a second catalog;
mapping at least a portion of the items and associated characteristics of the reference catalog into the second format to create the second catalog; and
maintaining, independently of maintaining the reference catalog, the second catalog by repeating the mapping of at least a portion of the reference catalog into the second catalog after maintaining the reference catalog, wherein the second catalog format may be different than the reference format;
wherein maintaining the second catalog comprises:
compiling a record of operations performed on the reference catalog and the time that each operation was performed;
compiling a record of operations performed on the second catalog and the time that each operation was performed;
performing the operations on the second catalog that are performed on the reference catalog and that also have a later time than the last operation performed on the second catalog.

5. The method of claim 4 wherein an operation comprises at least one of updating, revising and reformatting characteristics of an item and adding new items.

6. The method of claim 1 wherein maintaining the second catalog comprises recreating the second catalog by mapping at least a portion of the reference catalog into the second format after maintaining the reference catalog.

7. The method of claim 1 wherein the second format comprises a series of items with associated characteristics, the characteristics being expressed in accordance with a specified style.

8. The method of claim 7 wherein the second catalog characteristics include attributes and categories.

9. The method of claim 7 wherein values for the categories must be selected from a list of possible choices and the list is determined by the format of the second catalog.

10. The method of claim 1 wherein maintaining the reference catalog comprises changing values of characteristics for items in the catalog.

11. The method of claim 1 wherein maintaining the reference catalog comprises mapping values for characteristics into other characteristics.

12. The method of claim 1 wherein maintaining the reference catalog comprises mapping categories for items into other categories.

13. The method of claim 1 wherein maintaining the reference catalog comprises adding new items and associated characteristics to the reference catalog.

14. A machine readable medium having stored thereon data representing sequences of instructions, which when executed by the processor cause the processor to perform operations comprising:
providing a reference electronic catalog that has a reference format and a plurality of items, with each item having associated characteristics stored in one or more data fields associated with the item, wherein the reference catalog is not a list of pointers to data access structures that are used to control access to data; maintaining the reference electronic catalog with updates and revisions to the items and associated characteristics that are stored in one or more data fields associated with the items;
establishing a second electronic catalog format for a second catalog;
mapping at least a portion of the items and associated characteristics of the reference catalog into the second format to create the second catalog;
maintaining the second catalog by repeating the mapping of at least a portion of the reference catalog into the second catalog after maintaining the reference catalog;
establishing a third electronic catalog format for a third catalog;
mapping at least a portion of the items and associated characteristics of the reference catalog into the third format to create the third catalog; and
maintaining the third catalog, independently of maintaining the second catalog and independently of maintaining the reference catalog, by repeating the mapping of at least a portion of the reference catalog into the third catalog after maintaining the reference catalog, wherein the reference format may be different than the second electronic catalog format and the third electronic catalog format; and recording the time of each maintenance of the reference catalog and recording the time of each maintenance of the second catalog and wherein maintaining the second catalog comprises comparing the recorded times and mapping only portions of the reference catalog that have been maintained into the second catalog.

15. The medium of claim 14 wherein repeating the mapping comprises mapping only portions of the reference catalog that have been maintained into the second catalog.

16. The medium of claim 14 wherein recording comprises associating a record with each item of the reference catalog and second catalog, respectively, and wherein maintaining the second catalog comprise comparing the recorded times for each item in the second catalog to the recorded times for each corresponding item in the reference catalog and mapping any changes in the reference catalog that occur after the last change in the second catalog to the second catalog.

17. The medium of claim 14 wherein maintaining the second catalog comprises recreating the second catalog by mapping at least a portion of the reference catalog into the second format after maintaining the reference catalog.

18. The medium of claim 14 wherein the second format comprises a series of items with associated characteristics, the characteristics being expressed in accordance with a specified style.

19. The medium of claim 18 wherein the second catalog characteristics include attributes and categories.

20. The medium of claim 18 wherein values for the categories must be selected from a list of possible choices and the list is determined by the format of the second catalog.

21. The medium of claim 14 wherein maintaining the reference catalog comprises changing values of characteristics for items in the catalog.

22. The medium of claim 14 wherein maintaining the reference catalog comprises mapping values for characteristics into other characteristics.

23. The medium of claim 14 wherein maintaining the reference catalog comprises mapping categories for items into other categories.

24. The medium of claim 14 wherein maintaining the reference catalog comprises adding new items and associated characteristics to the reference catalog.

25. A machine readable medium having stored thereon data representing, sequences of instructions which, when executed by a processor, cause the processor to perform operations comprising:

providing a reference electronic catalog that has a reference format and a plurality of items, with each item having associated characteristics stored in one or more data fields associated with the item, wherein the reference catalog is not a list of pointers to data access structures that are used to control access to data; maintaining the reference electronic catalog with updates and revisions to the items and associated characteristics that are stored in one or more data fields associated with the items;

establishing a second electronic catalog format for a second catalog;

mapping at least a portion of the items and associated characteristics of the reference catalog into the second format to create the second catalog;

maintaining the second catalog by repeating the mapping of at least a portion of the reference catalog into the second catalog after maintaining the reference catalog;

establishing a third electronic catalog format for a third catalog;

mapping at least a portion of the items and associated characteristics of the reference catalog into the third format to create the third catalog; and maintaining the third catalog, independently of maintaining the second catalog and independently of maintaining the reference catalog, by repeating the mapping of at least a portion of the reference catalog into the third catalog after maintaining the reference catalog, wherein the reference format may be different than the second electronic catalog format and the third electronic catalog format;

wherein maintaining the second catalog comprises:

compiling a record of operations performed on the reference catalog and the time that each operation was performed;

compiling a record of operations performed on the second catalog and the time that each operation was performed;

performing the operations on the second catalog that are performed on the reference catalog and that also have a later time than the last operation performed on the second catalog.

26. The medium of claim 25 wherein an operation comprises at least one of updating, revising and reformatting characteristics of an item and adding new items.

* * * * *